United States Patent
Park et al.

(10) Patent No.: US 10,667,248 B2
(45) Date of Patent: *May 26, 2020

(54) METHOD FOR PROCESSING NDI IN RANDOM ACCESS PROCEDURE AND A METHOD FOR TRANSMITTING AND RECEIVING A SIGNAL USING THE SAME

(71) Applicant: LG Electronics Inc., Seoul (KR)

(72) Inventors: Sung Jun Park, Anyang-si (KR); Seung June Yi, Anyang-si (KR); Young Dae Lee, Anyang-si (KR); Sungduck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,360

(22) Filed: May 14, 2019

(65) Prior Publication Data

US 2019/0268900 A1  Aug. 29, 2019

Related U.S. Application Data

(60) Continuation of application No. 15/612,864, filed on Jun. 2, 2017, now Pat. No. 10,321,444, which is a
(Continued)

(30) Foreign Application Priority Data

Jun. 4, 2009  (KR) .................. 10-2009-0049516
Jun. 24, 2009  (GB) .................... 0910933.1
Jun. 26, 2009  (EP) ..................... 09163938

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/1812* (2013.01); *H04L 1/1822* (2013.01);
(Continued)

(58) Field of Classification Search
None
See application file for complete search history.

(56) References Cited

U.S. PATENT DOCUMENTS 6,901,063 B2  5/2005  Vayanos et al.
7,426,201 B2  9/2008  Kim et al.
(Continued)

FOREIGN PATENT DOCUMENTS

CN  101212775  7/2008
EP   2104264   9/2009
(Continued)

OTHER PUBLICATIONS

3GPP: "Technical Specification Group Radio Access Network; Evolved Universal Terrestrial Radio Access (E-ULTRA) Medium Access Control (MAC) protocol specification (Release 8)", EGPP TS 36.321 V8.2.0, May 2008, pp. 1-33, XP002539526.
(Continued)

*Primary Examiner* — Bob A Phunkulh
(74) *Attorney, Agent, or Firm* — Fish & Richardson P.C.

(57) ABSTRACT

A method for transmitting an uplink signal by a user equipment (UE). The method includes receiving an uplink grant including a new data indicator (NDI) on a physical downlink control channel (PDCCH) from a network, determining whether the PDCCH is not addressed to a temporary cell identifier, determining whether the NDI has been toggled when the PDCCH is not addressed to the temporary cell identifier, and transmitting a new data to the network when the NDI has been toggled.

9 Claims, 12 Drawing Sheets

Related U.S. Application Data continuation of application No. 15/216,515, filed on Jul. 21, 2016, now Pat. No. 9,693,343, which is a continuation of application No. 14/696,189, filed on Apr. 24, 2015, now Pat. No. 9,661,618, which is a continuation of application No. 13/753,237, filed on Jan. 29, 2013, now Pat. No. 9,137,824, which is a continuation of application No. 12/982,640, filed on Dec. 30, 2010, now Pat. No. 8,374,144, which is a division of application No. 12/496,721, filed on Jul. 2, 2009, now Pat. No. 7,961,680.

(60) Provisional application No. 61/087,153, filed on Aug. 7, 2008, provisional application No. 61/077,989, filed on Jul. 3, 2008.

(51) Int. Cl.
*H04L 1/18* (2006.01)
*H04W 74/00* (2009.01)
*H04W 74/08* (2009.01)
*H04W 72/12* (2009.01)

(52) U.S. Cl.
CPC ......... *H04L 1/1887* (2013.01); *H04W 72/042* (2013.01); *H04W 74/006* (2013.01); *H04W 74/0833* (2013.01); *H04W 72/1289* (2013.01)

(56) References Cited

U.S. PATENT DOCUMENTS

| | | | |
|---|---|---|---|
| 7,711,365 | B2 | 5/2010 | Nakamata |
| 2003/0147348 | A1 | 8/2003 | Jiang |
| 2003/0210668 | A1 | 11/2003 | Malladi et al. |
| 2005/0047393 | A1 | 3/2005 | Liu |
| 2005/0073987 | A1 | 4/2005 | Wu |
| 2006/0079264 | A1 | 4/2006 | Gu et al. |
| 2006/0291410 | A1 | 12/2006 | Herrmann |
| 2007/0115894 | A1 | 5/2007 | Herrmann et al. |
| 2007/0133579 | A1 | 6/2007 | Kim |
| 2007/0259665 | A1 | 11/2007 | Chiu et al. |
| 2007/0274264 | A1 | 11/2007 | Jiang |
| 2008/0005638 | A1 | 1/2008 | Kuo et al. |
| 2008/0005639 | A1 | 1/2008 | Frederiksen |
| 2008/0081651 | A1 | 4/2008 | Kuroda et al. |
| 2008/0123601 | A1 | 5/2008 | Malladi et al. |
| 2008/0159323 | A1 | 7/2008 | Rinne et al. |
| 2008/0192674 | A1 | 8/2008 | Wang et al. |
| 2008/0194243 | A1 | 8/2008 | Jeong et al. |
| 2008/0232284 | A1 | 9/2008 | Dalsgaard et al. |
| 2008/0233941 | A1 | 9/2008 | Jen |
| 2008/0253326 | A1 | 10/2008 | Damnjanovic |
| 2008/0310395 | A1 | 12/2008 | Kashima |
| 2009/0016278 | A1 | 1/2009 | Wakabayashi |
| 2009/0111476 | A1 | 4/2009 | Hamalainen et al. |
| 2009/0235139 | A1* | 9/2009 | Park ............ H04L 1/1819 714/750 |
| 2009/0268693 | A1 | 10/2009 | Lindh et al. |
| 2009/0276675 | A1 | 11/2009 | Ojala et al. |
| 2010/0048236 | A1 | 2/2010 | Higuchi et al. |
| 2010/0058135 | A1 | 3/2010 | Tseng |
| 2010/0067468 | A1 | 3/2010 | Ho et al. |
| 2010/0077272 | A1 | 3/2010 | Peisa et al. |
| 2011/0182245 | A1* | 7/2011 | Malkamaki ........ H04L 1/1812 370/329 |

FOREIGN PATENT DOCUMENTS

| | | |
|---|---|---|
| EP | 2141852 | 1/2010 |
| JP | 2002152311 | 5/2002 |
| KR | 1020030056950 | 7/2003 |
| KR | 1020070036731 | 4/2007 |
| KR | 100754552 | 9/2007 |
| KR | 1020080043042 | 5/2008 |
| KR | 1020080088665 | 10/2008 |
| WO | WO2005006640 | 1/2005 |
| WO | WO20070148881 | 12/2007 |
| WO | WO2008004842 | 1/2008 |
| WO | WO2008081222 | 7/2008 |
| WO | WO2009045011 | 4/2009 |
| WO | WO2009115904 | 9/2009 |
| WO | WO2010002130 | 1/2010 |

OTHER PUBLICATIONS

LG Electronics Inc: "NDI and Msg3" 3GPP Draft; R2-083723 NDI and Msg3, 3rd Generation Partnership Project (3GPP), Mobile Competence Centre; 650, Route Des Lucioles; F-06921 Cedex; France, vol. RAN WG2, No. Warsaw, Poland; Jun. 30, 2008, Jul. 4, 2008, XP050141043 Sophia-Antipolis.

LG Electronics Inc: "ND! and Msg3", 3GPP Draft; R2-083439 ND! and Msg3, 3rd Generation Partnership Project (3GPP), Mobile Competence Centre; 650, Route Des Lucioles; F-06921 Sophia-Antipolis Cedex; France; vol. RAN WG2, No. Warsaw, Poland; Jun. 30, 2008, Jun. 24, 2008, XP050140828.

LG Electronics, Inc., "ND! and Msg4 Carrying Contention Resolution ID", 3GPP Draft, R2-084390 ND! and Msg4, 3rd Generation Partnership Project (3GPP), Mobile Competence Centre, 650 Route Des Lucioles, F-06921 Sophia-Antipolis Cedex, France, No. Jeju; Aug. 12, 2008, XP050319460.

Prior Art Search Report, KIPRIS (Korean Intellectual Property Right Information Service), Jun. 2009.

ETSI MCC, "Report of 3GPP TSG RAN WG2 meeting #62bis, Warsaw, Poland, Jun. 31-Jul. 4, 2008", TSG-RAN Working Group 2 meeting #63, R2-083830, Jeju, Korea, Aug. 18-22, 2008, pp. 1-148.

* cited by examiner

METHOD FOR PROCESSING NDI IN RANDOM ACCESS PROCEDURE AND A METHOD FOR TRANSMITTING AND RECEIVING A SIGNAL USING THE SAME

CROSS REFERENCE TO RELATED APPLICATIONS

This application is a continuation of U.S. application Ser. No. 15/612,864, filed on Jun. 2, 2017, now allowed, which is a continuation of U.S. application Ser. No. 15/216,515, filed on Jul. 21, 2016, now U.S. Pat. No. 9,693,343, which is a continuation of U.S. application Ser. No. 14/696,189, filed on Apr. 24, 2015, now U.S. Pat. No. 9,137,824, which is a continuation of U.S. application Ser. No. 13/753,237, filed on Jan. 29, 2013, now U.S. Pat. No. 9,137,824, which is a continuation of U.S. application Ser. No. 12/982,640, filed on Dec. 30, 2010, now U.S. Pat. No. 8,374,144, which is a divisional of U.S. application Ser. No. 12/496,721, filed on Jul. 2, 2009, now U.S. Pat. No. 7,961,680, which claims the benefit of U.S. Provisional Application Nos. 61/087,153 filed on Aug. 7, 2008 and 61/077,989 filed on Jul. 3, 2008, and which claims the benefit of European Application No. 09163938.5, filed on Jun. 26, 2009, United Kingdom Application No. 0910933.1, filed on Jun. 24, 2009, and Korean Application No. 10-2009-0049516, filed on Jun. 4, 2009. The entire contents of all of the above applications are hereby incorporated by reference.

BACKGROUND OF THE INVENTION

The present invention relates to a method for transmitting and receiving a signal by efficiently processing a new data indicator (NDI) received and stored in a user equipment (UE) during a random access procedure of a mobile communication system, and a user equipment for the method.

As an example of a mobile communication system to which the present invention can be applied, a third generation partnership project long term evolution (3GPP LTE) communication system will be described in brief.

FIG. 1 is a diagram illustrating a network structure of an E-UMTS (Evolved-Universal Mobile Telecommunications System) which is a mobile communication system. An E-UMTS is a system evolving from the conventional universal mobile telecommunication system (UMTS) and its basic standardization is currently handled by the 3GPP. Generally, The E-UMTS may be called a long term evolution (LTE) system.

The E-UMTS network may largely be classified into a UMTS terrestrial radio access network (E-UTRAN) 101 and a core network (CN) 102. The E-UTRAN 101 includes a user equipment (UE) 103, a base station (eNode-B or eNB) 104, and an access gateway (AG) which is located at an end of the network and is connected to an external network. The AG 105 may be classified into a part for handling user traffic and a part for handling control traffic. At this time, an AG for handling new user traffic may communicate with another AG for handling control traffic via a new interface.

At least one cell exists in one eNB. An interface for transmitting user traffic or control traffic may be located between eNBs. The core network (CN) 102 can include a node for user registration of other user equipment (UE) 103 and the access gateway 105. An interface for discriminating between the E-UTRAN 101 and the CN 102 may also be used.

Layers of a radio interface protocol between a UE and a network can be classified into a first layer L1, a second layer L2 and a third layer L3 based on three lower layers of an OSI (open system interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the UE and the network. For this, the RRC layer enables RRC messages to be exchanged between the UE and the network. The RRC layer may distributively be located at network nodes including the eNode B 104, the AG 105 and the like, or may independently be located at either the eNode B 104 or the AG 105.

FIG. 2 and FIG. 3 are diagrams illustrating a structure of a radio interface protocol between a user equipment and UTRAN based on the 3GPP radio access network standard.

The radio interface protocol of FIG. 2 and FIG. 3 is horizontally divided into a physical layer PHY, a data link layer and a network layer, and is vertically divided into a user plane for transmitting data information and a control plane for transmitting control signaling. In detail, FIG. 2 illustrates layers of the radio protocol control plane and FIG. 3 illustrates the layers of the radio protocol user plane. The protocol layers of FIG. 2 and FIG. 3 may be divided into a first layer (L1), a second layer (L2) and a third layer (L3) based on the three lower layers of an open system interconnection (OSI) standard model which is well-known in the art of communication systems.

Hereinafter, each layer of the radio protocol control plane of FIG. 2 and the radio protocol user plane of FIG. 3 will be described.

The physical layer PHY, which is the first layer, provides an information transfer service to an upper layer by using a physical channel. The physical layer is connected with a medium access control (MAC) layer located at a higher level through a transport channel, and data between the MAC layer and the physical layer is transferred via the transport channel. At this time, the transport channel is divided into a dedicated transport channel and a common transport channel depending on channel sharing. Between different physical layers, namely, between physical layers of a transmitter and a receiver, data is transferred via the physical channel using radio resources.

Several layers exist in the second layer. First of all, a medium access control (MAC) layer of the second layer serves to map various logical channels with various transport channels. Also, the MAC layer performs multiplexing for mapping several logical channels with one transport channel. The MAC layer is connected with an RLC layer corresponding to its upper layer through the logical channel. The logical channel is divided into a control channel and a traffic channel depending on types of transmitted information, wherein the control channel transmits information of the control plane and the traffic channel transmits information of the user plane.

The RLC layer of the second layer serves to perform segmentation and concatenation of data received from its upper layer to control a size of the data so that the lower layer transmits the data to a radio-communication interval. Also, the RLC layer of the second layer provides three action modes, i.e., a transparent mode (TM), an unacknowledged mode (UM), and an acknowledged mode (AM) to ensure various quality of services (QoS) required by each radio bearer (RB). In particular, the AM RLC layer performs a retransmission function through automatic repeat and request (ARQ) for reliable data transmission.

In order to effectively transmit data using IP packets (e.g., IPv4 or IPv6) within a radio-communication interval having a narrow bandwidth, a PDCP (packet data convergence protocol) layer of the second layer (L2) performs header compression to reduce the size of IP packet header having relatively great size and unnecessary control information. The header compression is to increase transmission efficiency of the radio-communication period by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (hereinafter, abbreviated as 'RRC') layer located on the uppermost of the third layer is defined in the control plane only and is associated with configuration, re-configuration and release of radio bearers (hereinafter, abbreviated as 'RBs') to be in charge of controlling the logical, transport and physical channels. In this case, the RB means a logical path provided by the first and second layers of the radio protocol for the data transfer between the user equipment and the UTRAN. Generally, establishing RB means a procedure of defining features of a radio protocol layer and channel required for a specific service and establishing detailed parameters and action methods of the radio protocol layer and the channel. The RB is divided into a signaling RB (SRB) and a data RB (DRB). The SRB is used as a path for transmitting RRC message in a control plane (C-plane), and the DRB is used as a path for transmitting user data in a user plane (U-plane).

As downlink transport channels carrying data from the network to the user equipments, there are provided a broadcast channel (BCH) carrying system information and a downlink shared channel (SCH) carrying user traffic or control messages. The traffic or control messages of a downlink multicast or broadcast service may be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control messages.

As downlink physical channels carrying information transferred to a downlink transport channel to a radio interval between a network and a user equipment, there are provided a physical broadcast channel (PBCH) transmitting information of the BCH, a physical multicast channel (PMCH) transmitting information of the MCH, a physical downlink shared channel (PDSCH) transmitting information of the PCH and the downlink SCH, and a physical downlink control channel (PDCCH) (or DL L1/L2 control channel) transmitting information control information provided by the first layer and the second layer, such as downlink or uplink radio resource assignment information (DL/UL scheduling grant). Meanwhile, as uplink physical channels transmitting information transferred to an uplink transport channel to a radio interval between a network and a user equipment, there are provided a physical uplink shared channel (PUSCH) transmitting information of the uplink SCH, a physical random access channel (PRACH) transmitting RACH information, and a physical uplink control channel transmitting control information provided by the first layer and the second layer, such as HARQ ACK or NACK, scheduling request (SR), and channel quality indicator (CQI) report.

Hereinafter, a random access procedure provided by the LTE system will be described based on the aforementioned description.

First of all, the user equipment performs a random access procedure in case of the following cases:

when the user equipment performs initial access as the user equipment is not RRC connected with the base station;

when the user equipment first accesses a target cell during a handover procedure;

when a random access procedure is requested by a command of the base station;

when data to be transmitted to an uplink occurs in a state that time synchronization of an uplink is not appropriate or a designated radio resource is not assigned; and when the user equipment performs a recovery procedure during a radio link failure or handover failure.

The LTE system provides both a contention based random access procedure and a non-contention based random access procedure during a procedure of selecting a random access preamble. In the contention based random access procedure, the user equipment randomly selects one preamble from a specific set and uses the selected preamble. In the non-contention based random access procedure, the base station uses a random access preamble assigned to a specific user equipment. However, the non-contention based random access procedure can be used only in the aforementioned handover procedure or as requested by a command of the base station.

Meanwhile, the procedure of performing random access in the user equipment with a specific base station includes the steps of (1) transmitting a random access preamble from the user equipment to the base station ("first message (message 1)" transmitting step), (2) receiving a random access response message from the base station in response to the transmitted random access preamble ("second message (message 2)" receiving step), (3) transmitting an uplink message using information received in the random access response message ("third message (message 3)" transmitting step), and (4) receiving a message corresponding to the uplink message from the base station ("fourth message (message 4)" receiving step).

In a next generation mobile communication system including the LTE system, a hybrid automatic repeat request (HARQ) method is used as a method for efficiently performing uplink and/or downlink signal transmission including the aforementioned random access procedure. The HARQ method is a combined type of an ARQ scheme and a forward error correction (FEC) scheme. According to the ARQ scheme, a transmitter retransmits a signal of a receiver, which is failed in reception, by feeding ACK/NACK signal back depending on whether a received signal is successfully decoded. The FEC scheme is to acquire coding gain and/or SINR gain by combining the failed signal with the retransmitted signal to correct an error of the received signal. In order to perform the aforementioned HARQ scheme, the base station can transmit a new data indicator (NDI) through the PDCCH, wherein the NDI is to indicate the user equipment whether the user equipment performs new data transmission or data retransmission to the uplink. Likewise, the base station can transmit an NDI through the PDCCH, wherein the NDI is to indicate the user equipment whether the base station performs new data transmission or data retransmission to the downlink.

Generally, an NDI field is a 1-bit field, and is toggled in the order of 0→1→0→1→ . . . whenever new data is transmitted. In case of retransmission, the NDI field has the same value as that of initial transmission. Namely, the user equipment compares a previously transmitted value with the NDI field to identify whether data retransmission is performed.

Meanwhile, a plurality of HARQ processes are operated independently within the user equipment. Since independent data transmission is performed for each of the HARQ processes, NDI is established for each of the HARQ processes. In this case, a specific HARQ process may be involved in general uplink/downlink data transmission and reception including the aforementioned random access procedure in accordance with data. More detailed studies of an action of NDI in determining whether the user equipment determines retransmission during uplink/downlink data transmission and reception after a random access procedure will be required, wherein the NDI is received to correspond to a specific HARQ process during the random access procedure.

SUMMARY OF THE INVENTION

Accordingly, the present invention is directed to a method for transmitting and receiving a signal and a user equipment for the same, which substantially obviate one or more problems due to limitations and disadvantages of the related art.

An object of the present invention is to provide a method for transmitting and receiving a signal and a user equipment for the same, in which the signal is transmitted and received in accordance with an HARQ scheme by considering an action of NDI, which is received during a random access procedure, on uplink signal transmission and downlink data reception using a HARQ scheme of a user equipment after the random access procedure, and efficiently processing NDI received during a random access procedure and NDI received after the random access procedure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting an uplink signal from a user equipment (UE) to a base station comprises receiving a first uplink (UL) grant signal through a message identified by a temporary cell identifier (Temporary C-RNTI) from a base station, the first uplink grant signal including a new data indicator (NDI) toggled if the base station indicates new transmission; receiving a second uplink grant signal through a downlink control channel identified by a cell identifier (C-RNTI) from the base station, the second uplink grant signal including a new data indicator (NDI) with a predetermined value; and determining uplink signal retransmission of the user equipment depending on whether the NDI of the second uplink grant signal has been toggled, wherein the UE ignores the NDI received using the temporary cell identifier.

In another aspect of the present invention, a method for receiving a downlink signal from a base station to a user equipment (UE) comprises receiving a first downlink (DL) assignment signal through a message identified by a temporary cell identifier (Temporary C-RNTI) from a base station, the first downlink assignment signal including a new data indicator (NDI) toggled if the base station indicates new transmission; receiving a second downlink assignment signal through a downlink control channel identified by a cell identifier (C-RNTI) from the base station, the second downlink assignment signal including a new data indicator (NDI) with a predetermined value; and determining downlink signal retransmission from the base station depending on whether the NDI of the second downlink assignment signal has been toggled, wherein the UE ignores the NDI received using the temporary cell identifier.

In other aspect of the present invention, a user equipment comprises a physical layer module including a receiving module and a transmitting module, the receiving module for receiving a downlink control channel and a downlink shared channel, the downlink control channel including a new data indicator (NDI) toggled if a base station indicates new transmission; and a MAC layer module including a plurality of HARQ process modules, a plurality of buffers respectively corresponding to the plurality of HARQ process modules, and a single HARQ entity, the HARQ entity controlling the plurality of HARQ process modules to allow a specific one of the HARQ process modules to process the downlink control channel and the downlink shared channel received by the receiving module and an uplink shared channel transmitted from the transmitting module, wherein the HARQ entity or the specific HARQ process module combines NDI bit value previously stored in a specific buffer corresponding to the specific HARQ process module with NDI value received to correspond to the specific HARQ process module to determine whether to perform retransmission depending on whether the NDI bit value has been toggled, and ignores NDI received using a temporary cell identifier stored in the specific buffer when the HARQ entity or the specific HARQ process module determines whether the NDI bit value has been toggled.

According to the aforementioned embodiments of the present invention, since NDI received during a random access procedure and NDI received after the random access procedure are efficiently processed, error operation of the user equipment can be prevented from occurring when a signal is transmitted and received in accordance with a HARQ scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on a mobile communication system of 3GPP LTE system, the following description can be applied to other mobile communication systems except unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment designates a mobile or fixed type user terminal such as a mobile station (MS). It is also assumed that a base station designates a random node of a network node, such as Node B and eNode B, which performs communication with a user equipment.

As described above, in order to consider an action of NDI, which is received during a random access procedure, on uplink signal transmission and downlink data reception using a HARQ scheme of a user equipment after the random access procedure, signal transmission and reception using the aforementioned random access procedure and HARQ scheme will be described in detail.

Figure 1:
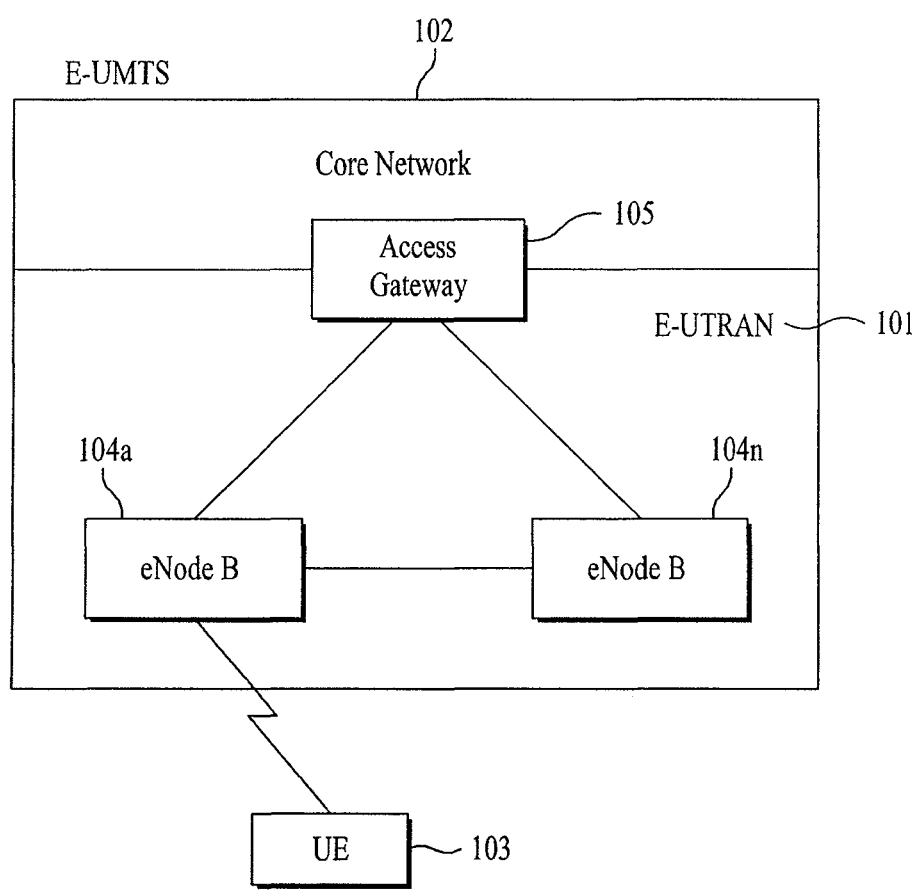
FIG. 1 is a diagram illustrating a network structure of an E-UMTS (Evolved-Universal Mobile Telecommunications System) which is an example of a mobile communication system.
Figure 2:
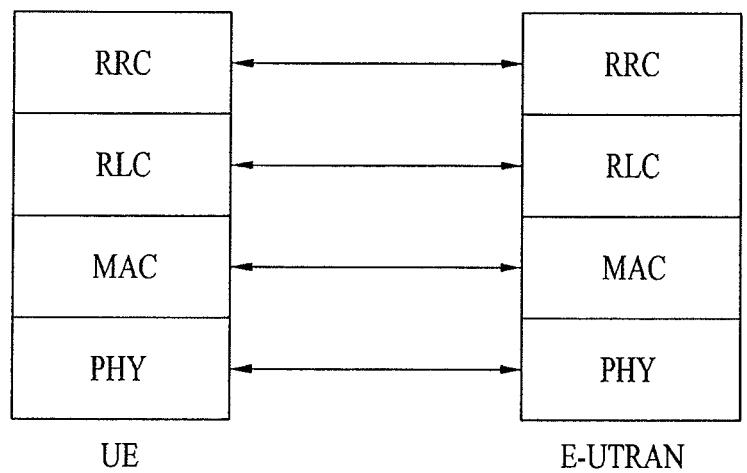
FIG. 2 and FIG. 3 are diagrams illustrating a structure of a radio interface protocol between a user equipment and UTRAN based on the 3GPP radio access network standard.
Figure 3:
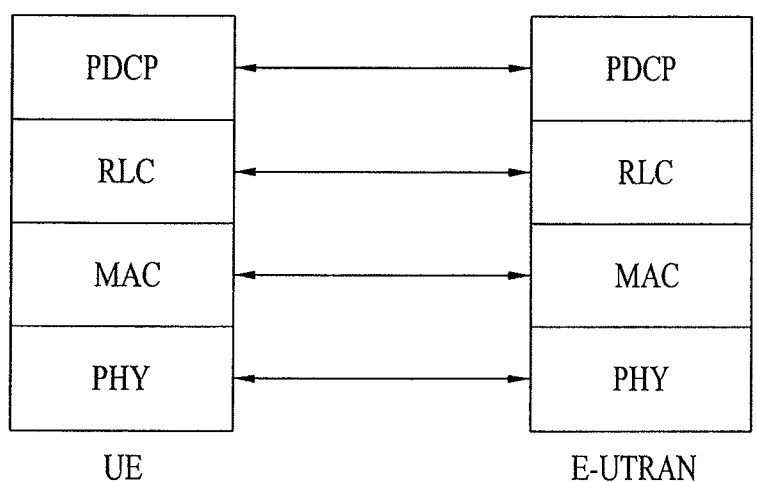
Figure 4:
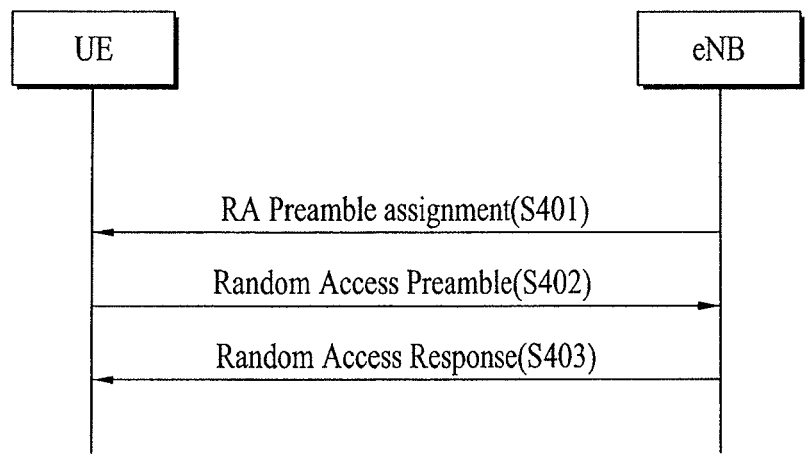
FIG. 4 is a diagram illustrating an operation procedure of a user equipment and a base station during a non-contention based random access procedure.

FIG. 4 is a diagram illustrating an operation procedure of a user equipment and a base station during a non-contention based random access procedure.

(1) Random Access Preamble Assignment

As described above, the non-contention based random access procedure can be performed for two cases, i.e., (1) when a handover procedure is performed, and (2) when requested by a command of the base station. Of course, the contention based random access procedure may also be performed for the two cases.

First of all, for non-contention based random access procedure, it is important that the user equipment receives a designated random access preamble having no possibility of contention from the base station. Examples of a method of receiving a random access preamble include a method through a handover command and a method through a PDCCH command. A random access preamble is assigned to the user equipment through the method of receiving a random access preamble (S401).

(2) First Message Transmission

As described above, after receiving a random access preamble designated only for the user equipment, the user equipment transmits the preamble to the base station (S402).

(3) Second Message Reception

After the user equipment transmits the random access preamble in step S402, the base station tries to receive its random access response within a random access response receiving window indicated through system information or handover command (S403). In more detail, the random access response can be transmitted in the form of a MAC protocol data unit (MAC PDU), and the MAC PDU can be transferred through a physical downlink shared channel (PDSCH). Also, it is preferable that the user equipment monitors a physical downlink control channel (PDCCH) to appropriately receive information transferred to the PDSCH. Namely, it is preferable that the PDCCH includes information of a user equipment which should receive the PDSCH, frequency and time information of radio resources of the PDSCH, and a transport format of the PDSCH. If the user equipment successfully receives the PDCCH transmitted thereto, the user equipment can appropriately receive a random access response transmitted to the PDSCH in accordance with the information of the PDCCH. The random access response can include a random access preamble identifier (ID) (for example, random access preamble identifier (RA-RNTI)), uplink grant indicating uplink radio resources, a temporary C-RNTI, and timing advance command (TAC) values.

As described above, the random access preamble identifier is required for the random access response to indicate whether the uplink grant, the temporary C-RNTI and the TAC values are effective for what user equipment as random access response information for one or more user equipments can be included in one random access response. In this case, it is assumed that the user equipment selects a random access preamble identifier corresponding to the random access preamble selected in step S402.

In the non-contention based random access procedure, the user equipment can terminate the random access procedure after determining that the random access procedure has been normally performed by receiving the random access response information.

Figure 5:
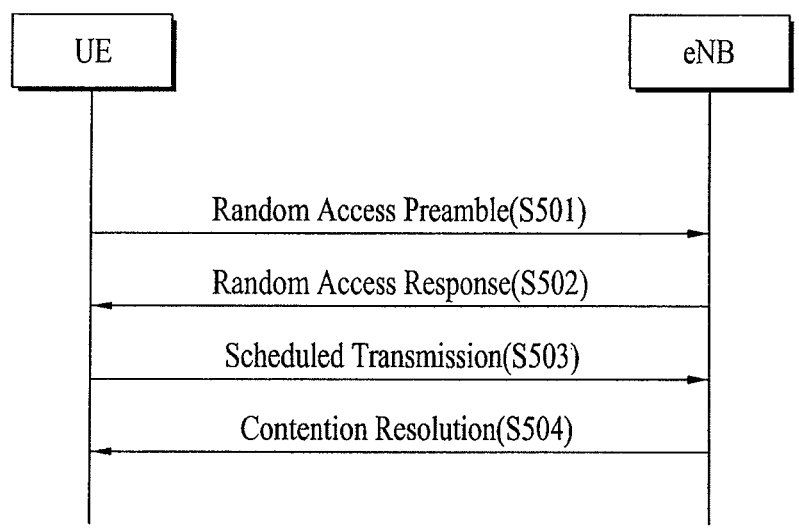
FIG. 5 is a diagram illustrating an operation procedure of a user equipment and a base station during a contention based random access procedure.

FIG. 5 is a diagram illustrating an operation procedure of a user equipment and a base station during a contention based random access procedure.

(1) First Message Transmission

First of all, the user equipment randomly selects one random access preamble from a set of random access preambles indicated through system information or handover command, and selects a physical RACH (PRACH) resource that can transmit the random access preamble (S501).

(2) Second Message Reception

A method of receiving random access response information is similar to that of the aforementioned non-contention based random access procedure. Namely, after the user equipment transmits the random access preamble in step S402, the base station tries to receive its random access response within a random access response receiving window indicated through system information or handover command, and receives the PDSCH through corresponding random access identifier information (S502). In this case, the base station can receive uplink grant, a temporary C-RNTI, and timing advance command (TAC) values.

(3) Third Message Transmission

If the user equipment receives its effective random access response, the user equipment respective processes information included in the random access response. Namely, the user equipment applies TAC and store a temporary C-RNTI. Also, the user equipment transmits data (i.e., third message) to the base station using UL grant (S503). The third message should include a user equipment identifier. This is because that the base station needs to identify user equipments which perform the contention based random access procedure, thereby avoiding contention later.

Two methods have been discussed to include the user equipment identifier in the third message. In the first method, if the user equipment has an effective cell identifier previously assigned from a corresponding cell before the random access procedure, the user equipment transmits its cell identifier through an uplink transport signal corresponding to the UL grant. On the other hand, if the user equipment does not have an effective cell identifier previously assigned from a corresponding cell before the random access procedure, the user equipment transmits its cell identifier including its unique identifier (for example, S-TMSI or random ID). Generally, the unique identifier is longer than the cell identifier. If the user equipment transmits data corresponding to the UL grant, the user equipment starts a contention resolution timer.

(4) Fourth Message Reception

After transmitting data including its identifier through UL grant included in the random access response, the user equipment waits for a command of the base station for contention resolution. Namely, the user equipment tries to receive the PDCCH to receive a specific message (504). Two methods have been discussed to receive the PDCCH. As described above, if the third message is transmitted to correspond to the UL grant using the user equipment identifier, the user equipment tries to receive the PDCCH using its cell identifier. If the user equipment identifier is a unique identifier of the user equipment, the user equipment tries to receive the PDCCH using a temporary cell identifier included in the random access response. Afterwards, in case of the first method, if the user equipment receives the PDCCH through its cell identifier before the contention resolution timer expires, the user equipment determines that the random access procedure has been performed normally, and ends the random access procedure. In case of the second method, if the user equipment receives the PDCCH through the temporary cell identifier before the contention resolution timer expires, the user equipment identifies data transferred from the PDSCH. If the unique identifier of the user equipment is included in the data, the user equipment determines that the random access procedure has been performed normally, and ends the random access procedure.

Meanwhile, for adaptive retransmission of the third message in the aforementioned random access procedure, the base station can transmit UL grant signal with NDI for indicating retransmission to the user equipment. Also, the base station can transmit downlink (DL) assignment for receiving the PDSCH to the PDCCH of the fourth message together with a specific NDI.

Accordingly, in a state that the NDI established for a specific HARQ process is stored during the random access procedure, the random access procedure is terminated by other HARQ process. Afterwards, if general uplink signal transmission or downlink signal reception is performed, since the base station cannot identify information of the NDI established for HARQ process other than the HARQ process used when the random access procedure ends, the user equipment confuses new data transmission with data retransmission, whereby error operation of the user equipment may occur. In more detail, HARQ action of the MAC layer in the LTE system will be described, wherein the HARQ action is divided into uplink data transmission and downlink data reception.

Figure 6:
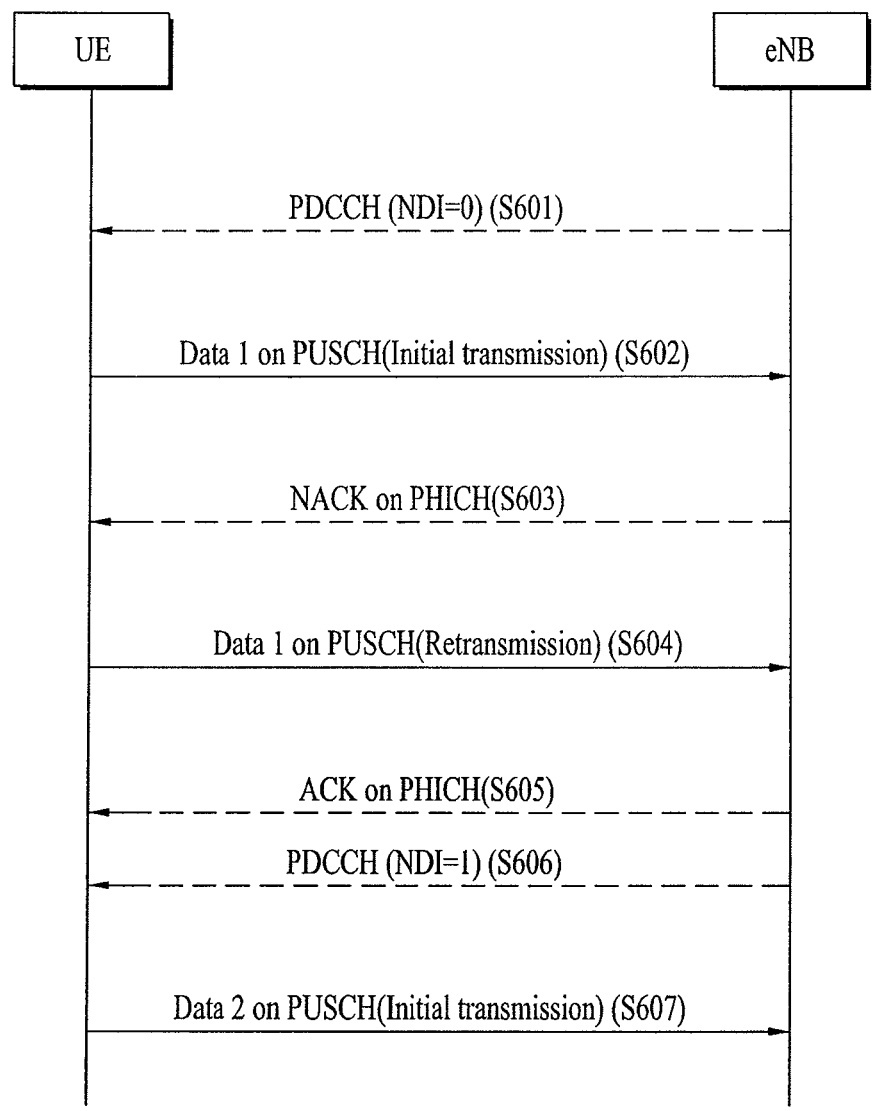
FIG. 6 is a diagram illustrating an uplink HARQ action scheme.

FIG. 6 is a diagram illustrating an uplink HARQ action scheme.

In order to transmit data to the base station in accordance with the HARQ scheme, the user equipment can receive UL grant information or uplink scheduling information (UL scheduling information) from the base station through the PDCCH (S601). Generally, the UL scheduling information includes user equipment identifier (for example, C-RNTI or Semi-Persistent Scheduling C-RNTI), resource block assignment, transmission parameters (modulation, coding scheme and redundancy version), and NDI. In case of the LTE system, the user equipment has eight HARQ processes which are operated synchronously with a transmission time interval (TTI). Namely, after HARQ process 1 is used in TTI 1, HARQ process 2 in TTI HARQ process 8 in TTI 8, HARQ process 1 is used in TTI 9 and HARQ process 2 is used in TTI 10. In this way, specific HARQ processes can be assigned in due order in accordance with each data receiving timing point.

Furthermore, since the HARQ processes are assigned synchronously as described above, the HARQ process connected with the TTI where the PDCCH has received for initial transmission of specific data is used for data transmission. For example, if the user equipment receives the PDCCH including UL scheduling information in the Nth TTI, the user equipment transmits data in $N+4^{th}$ TTI. In other words, HARQ process K assigned in the $N+4^{th}$ TTI is used for data transmission. Namely, the user equipment monitors the PDCCH every TTI to identify the UL scheduling information transmitted thereto, and then transmits data to the base station through the PUSCH in accordance with the UL scheduling information (S602).

If the data is received from the user equipment, the base station stores the data in a soft buffer and then tries decoding of the data. If decoding of the data is successfully performed, the base station transmits ACK signal to the user equipment. If decoding of the data is failed, the base station transmits NACK signal to the user equipment. In FIG. 6, as decoding of the data is failed, the base station transmits NACK signal to the user equipment through a physical HARQ indicator channel (PHICH) (S603).

If the ACK signal is received from the base station, the user equipment senses that data transmission to the base station has been successfully completed, and transmits next data. However, as illustrated in FIG. 6, if the NACK signal is received from the base station, the user equipment senses that data transmission to the base station has been failed, and retransmits the same data in accordance with the same format or new format (S604).

HARQ retransmission of the user equipment can be operated in accordance with a non-adaptive mode. Namely, initial transmission of specific data can be performed only if the PDCCH including UL scheduling information should be received, but retransmission can be performed even though the PDCCH is not received. According to the HARQ retransmission of the non-adaptive mode, data retransmission is performed using the same UL scheduling information as that of the initial transmission in the TTI where next HARQ process is assigned, even though the PDCCH is received.

Meanwhile, HARQ retransmission of the user equipment can be operated in accordance with an adaptive mode. In this case, transmission parameters of retransmission are received through the PDCCH. Scheduling information included in the PDCCH may be different from that of initial transmission depending on channel status. For example, if the channel status is better than that of initial transmission, the user equipment commands data transmission at a high bit rate. On the other hand, if the channel status is not better than that of initial transmission, the user equipment commands data transmission at a low bit rate.

If the user equipment receives UL scheduling information through the PDCCH, the user equipment can identify whether data to be transmitted corresponds to initial transmission or retransmission of previous data, through NDI field included in the PDCCH. The NDI field is toggled in the order of 0→1→0→1→ . . . whenever new data is transmitted, as described above. In case of retransmission, the NDI field has the same value as that of initial transmission. Accordingly, the user equipment compares the NDI field with a previously transmitted value to identify whether data retransmission is performed.

The user equipment counts the number of transmission times (CURRENT_TX_NB) whenever transmitting data in accordance with the HARQ scheme. If the number of transmission times reaches the maximum number of transmission times (CURRENT_TX_NB) established in the RRC layer, the user equipment deletes the data stored in the HARQ buffer.

Meanwhile, if retransmitted data is received, the base station combines the retransmitted data with the data stored in the soft buffer in a state that its decoding is failed, in accordance with various manners, and then tries decoding again. If decoding is successfully performed, the base station transmits ACK signal to the user equipment. If decoding is failed, the base station transmits NACK signal to the user equipment. The base station repeats the procedure of transmitting NACK signal and receiving the retransmitted signal until decoding of the data is successfully performed. In the example of FIG. 6, the base station tries decoding by combining the data retransmitted in step S604 with the previously received data. If decoding of the received data is successfully performed, the base station transmits ACK signal to the user equipment through the PHICH (S605). Also, the base station can transmit UL scheduling information for next data transmission to the user equipment through the PDCCH, and can toggle the NDI to 1 to indicate that the UL scheduling information is used for new data transmission not adaptive retransmission (S606). Then, the user equipment can transmit new data to the base station through the PUSCH corresponding to the received UL scheduling information (S607).

Figure 7:
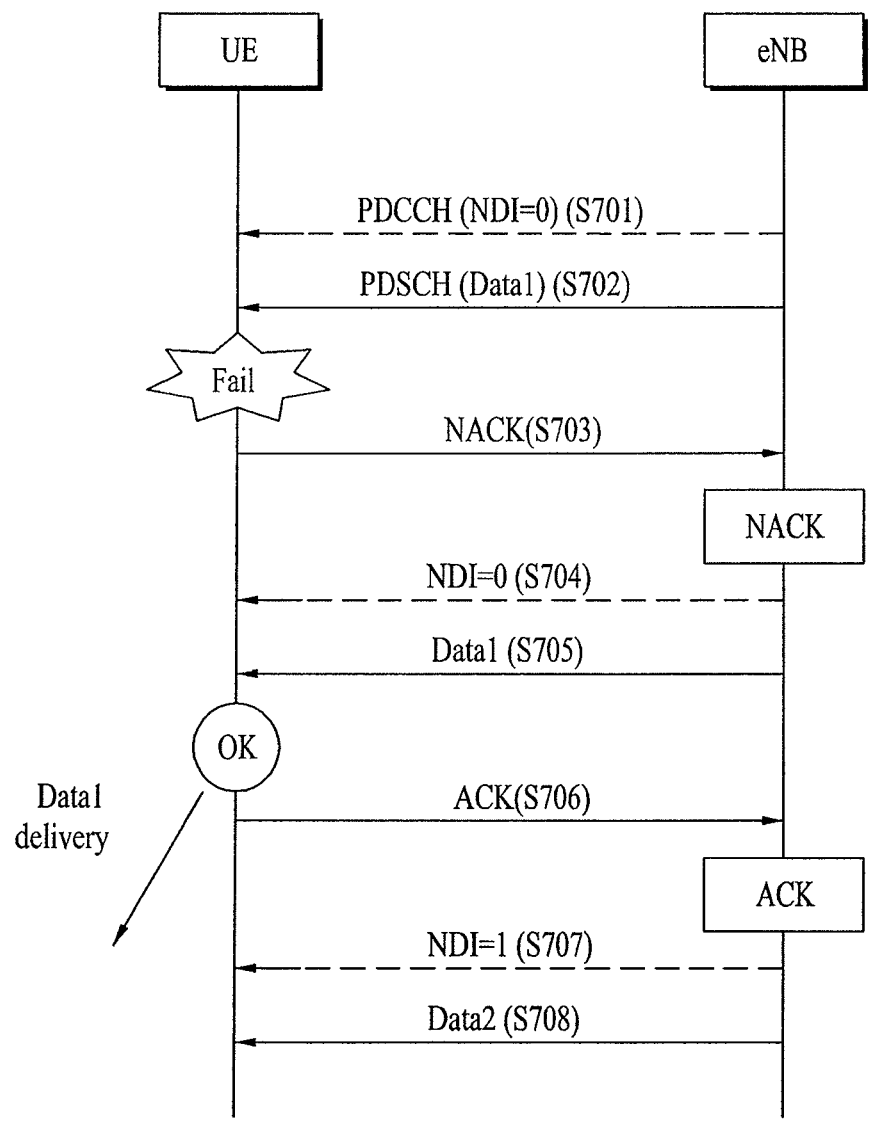
FIG. 7 is a diagram illustrating a downlink HARQ action scheme.

FIG. 7 is a diagram illustrating a downlink HARQ action scheme.

In order to transmit data to the user equipment in accordance with the HARQ scheme, the base station can transmit downlink scheduling information (DL scheduling information) to the user equipment through the PDCCH (S701). The DL scheduling information includes user equipment identifier (for example, UE ID), user equipment group ID, resource block assignment, duration of assignment, transmission parameters (modulation mode, payload size, MIMO related information, HARQ process information, and redundancy version), and NDI. In step S701 of FIG. 7, an initial NDI is set to 0.

The DL scheduling information is retransmitted through the PDCCH, and may be varied depending on the channel status. For example, if the channel status is better than that of initial transmission, the base station transmits data at a high bit rate by changing modulation or payload size. On the other hand, if the channel status is not better than that of initial transmission, the base station transmits data at a bit rate lower than that of initial transmission.

After identifying the DL scheduling information transmitted to the user equipment by monitoring the PDCCH every TTI, if there is information of the user equipment in the DL scheduling information, the user equipment receives data from the base station through the PDSCH at the time associated with the PDCCH (S702). If the data is received from the base station, the user equipment stores the data in a soft buffer and then tries decoding of the data. The user equipment transmits HARQ feedback information to the base station in accordance with the decoded result (S703). Namely, if decoding of the data is successfully performed, the user equipment transmits ACK signal to the base station. If decoding of the data is failed, the user equipment transmits NACK signal to the base station. In FIG. 7, as decoding of the data received in step S702 is failed, the user equipment transmits NACK signal to the base station.

If the ACK signal is received from user equipment, the base station senses that data transmission to the user equipment has been successfully and transmits next data. Meanwhile, if the NACK signal is received from the user equipment, the base station senses that data transmission to the user equipment has been failed, and timely retransmits the same data in accordance with the same format or new format (S604). In the example of FIG. 7, since the base station receives NACK from the user equipment, the base station transmits NDI with a value of 0, i.e., indicating retransmission to the user equipment (S704), and data is retransmitted through the PDSCH corresponding to the DL assignment information included in the PDCCH (S705).

Meanwhile, the user equipment which has received NACK signal tries to receive retransmitted data. The user equipment can identify whether data to be transmitted corresponds to initial transmission or retransmission of previous data, through NDI field included in the PDCCH. In this embodiment, as the user equipment receives the PDCCH where NDI is set to 0, the user equipment can identify that the received data is retransmitted data. In this case, the user equipment combines the data received in step S705 with the data received and stored in step S702 in accordance with various manners, and then tries decoding again.

If decoding is successfully performed, the user equipment transmits ACK signal to the base station (S706). The base station which has received the ACK signal transmits new data to the user equipment (S708). To this end, the base station transmits NDI toggled to 1 and DL assignment information for new data reception through the PDCCH to indicate that the transmitted data is new data (S707).

A problem in respect of the NDI, which may occur as the aforementioned HARQ scheme is combined with the random access procedure, will be described.

The user equipment transmits and receives the third message and the fourth message using UL HARQ scheme and DL HARQ scheme, respectively, during the random access procedure.

First of all, the problem in respect of the NDI in transmitting the third message in accordance with the UL HARQ scheme will be described as follows.

The user equipment can transmit the third message to the base station through UL scheduling or UL grant included in the second message received during the random access procedure. If the base station has received the third message but has failed in decoding, the base station transmits NACK signal to the user equipment through HARQ feedback to command the user equipment to retransmit the third message. If the user equipment receives the HARQ NACK only, the user equipment retransmits the third message using radio resource and transport format indicated by the UL grant of the second message. However, in accordance with the channel status or scheduling policy, the base station can separately command the user equipment to use UL grant separately transmitted for retransmission instead of UL grant included in the second message during retransmission of the third message. In this case, the UL grant for retransmission of the third message is transferred to the user equipment through the PDCCH masked with the temporary cell identifier of the user equipment.

It is assumed that the user equipment has transmitted the third message to the base station during the first random access procedure under the aforementioned system and has received UL grant for retransmission through the PDCCH masked with the temporary cell identifier of the user equipment in accordance with a request of retransmission. Additionally, it is assumed that it is commanded to use HARQ process "A" for UL grant for the third message. It is also assumed that the user equipment performs the second random access procedure as retransmission of the third message is failed. Moreover, it is assumed that the second random access procedure has been successfully completed as the user equipment receives the second message and transmits the third message using HARQ process "B" indicated through UL grant received through the second message, and the base station normally receives the third message.

At this time, the base station cannot identify the first random access procedure of the user equipment. Namely, during the first random access procedure, the HARQ process "A" of the user equipment stores NDI indicated by the UL grant of the PDCCH masked with the temporary cell identifier of the user equipment, wherein the UL grant has been received for retransmission of the third message, but the base station cannot identify information of NDI value set for HARQ processes other than the HARQ process "B" when the random access procedure is successfully completed.

Accordingly, after the second (or third or more) random access procedure is successfully completed, when the base station schedules a radio resource of the HARQ process "A" of the user equipment, if the base station schedules the radio resource with NDI which is not toggled, as compared with the NDI received during the random access procedure, a problem occurs in that the user equipment determines the radio resource as a radio resource for retransmission.

Next, the problem in respect of the NDI in transmitting the fourth message in accordance with the DL HARQ scheme will be described as follows.

The user equipment can receive specific DL assignment through the PDCCH masked with the temporary cell identifier to receive the fourth message during the random access procedure. It is assumed that the HARQ process indicated by the received specific DL assignment is "C." The NDI indicated by the specific DL assignment can be stored using the HARQ process "C" of the user equipment. It is assumed that the second random access procedure is required as decoding of the fourth message received by the specific DL assignment is failed. It is also assumed that the user equipment receives a contention resolution message using HARQ process "D" in accordance with DL assignment indicated by the PDCCH masked with the temporary cell identifier during the second random access procedure, whereby the random access procedure is completed successfully.

Afterwards, since the base station does not know the first random access procedure of the user equipment like the UL HARQ, the base station does not know the NDI value stored in the HARQ process "C" of the user equipment. Namely, if the same NDI value as that used for the HARQ process "C" of the first random access procedure is transmitted, a problem occurs in that the user equipment combines the data stored in the HARQ soft buffer due to decoding failure in the first random access procedure with the newly received data in error.

Accordingly, one embodiment of the present invention suggests a method for processing NDI by ignoring NDI received and stored during a random access procedure when retransmission is determined depending on toggling of the NDI value. To this end, according to one embodiment of the present invention, considering that the NDI value received during the random access procedure is the NDI received through the PDCCH masked with the temporary cell identifier, the NDI received using the temporary cell identifier is ignored when retransmission is determined depending on toggling of the NDI value. Namely, when it is determined whether the NDI value has been toggled, it is suggested to consider only NDI included in UL grant or DL assignment received through the PDCCH masked with a user equipment identifier (for example, C-RNTI or SPS(Semi-Persistent Scheduling) C-RNTI) after the random access procedure.

Figure 8:
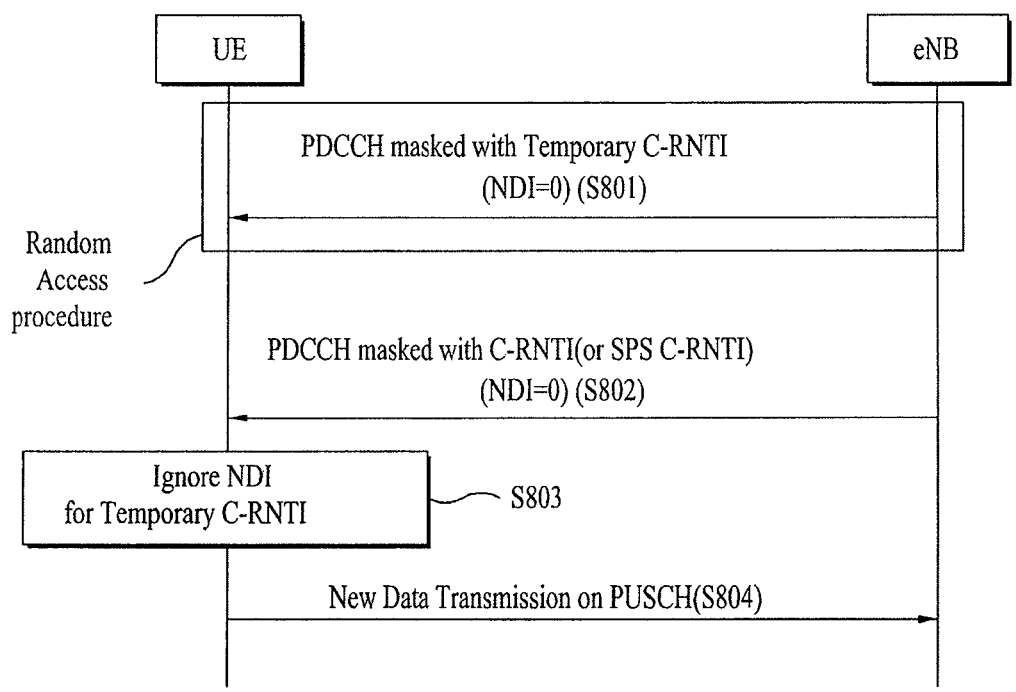
FIG. 8 is a diagram illustrating a method of transmitting an uplink signal from a user equipment using a HARQ scheme in accordance with one embodiment of the present invention.

FIG. 8 is a diagram illustrating a method of transmitting an uplink signal from a user equipment using a HARQ scheme in accordance with one embodiment of the present invention.

In the random access procedure, as described above, the user equipment can receive UL grant signal to transmit the third message (S801). In this case, UL grant can be received through the PDCCH masked with a temporary cell identifier (for example, temporary C-RNTI), and can include the aforementioned NDI. In the embodiment of FIG. 8, it is assumed that the NDI is set to 0.

Even after the random access procedure ends, to transmit an uplink signal, the user equipment receives the UL grant signal from the base station and then is assigned with a radio resource (S802). After the random access procedure ends, the UL grant can be received through the PDCCH masked with a cell identifier (for example, C-RNTI) not a temporary cell identifier. In the embodiment of FIG. 8, the NDI is set to 0 so that the base station newly transmits uplink data to the user equipment.

If the UL grant where the NDI value is set as illustrated in step S802 is received, the user equipment determines whether to transmit new data or perform data retransmission depending on whether there is the NDI value previously stored for the corresponding HARQ process or whether the previously stored NDI value has been toggled. In this case, according to this embodiment, the user equipment ignores the NDI value received using the temporary cell identifier (C-RNTI) during the random access procedure and determines whether the NDI value has been toggled, whereby data retransmission is determined in accordance with the determined result.

As described above, the NDI value can be set for each HARQ process. Accordingly, whether the received NDI value has been toggled can be determined depending on an NDI value previously stored to correspond to a specific HARQ process corresponding to the time when the corresponding UL grant signal is received and an NDI value of newly received UL grant. In the embodiment of FIG. 8, the NDI of 0 is received through the UL grant received in step S802, and the NDI received in step S801 is received using the temporary cell identifier. However, since the NDI received using the temporary cell identifier is ignored when it is determined whether the NDI has been toggled, the corresponding NDI is regarded as the NDI initially received, whereby the user equipment transmits new data to the base station through the PUSCH (S804). As a result of determining toggling of the NDI while ignoring the NDI received using the temporary cell identifier, if the NDI value is the same as that previously stored to correspond to the corresponding HARQ process, the user equipment can perform retransmission of the previously transmitted data.

According to this embodiment, whether the NDI value has been toggled is determined regardless of status and time as far as the NDI received using the temporary cell identifier is ignored. Also, a plurality of NDIs may be received using the temporary cell identifier. According to this embodiment, it is assumed that all NDIs received using the temporary cell identifier are ignored when it is determined whether the NDI value has been toggled. In the same manner as that of FIG. 8, a method for receiving a downlink signal in a user equipment in accordance with a DL HARQ scheme will be described.

Figure 9:
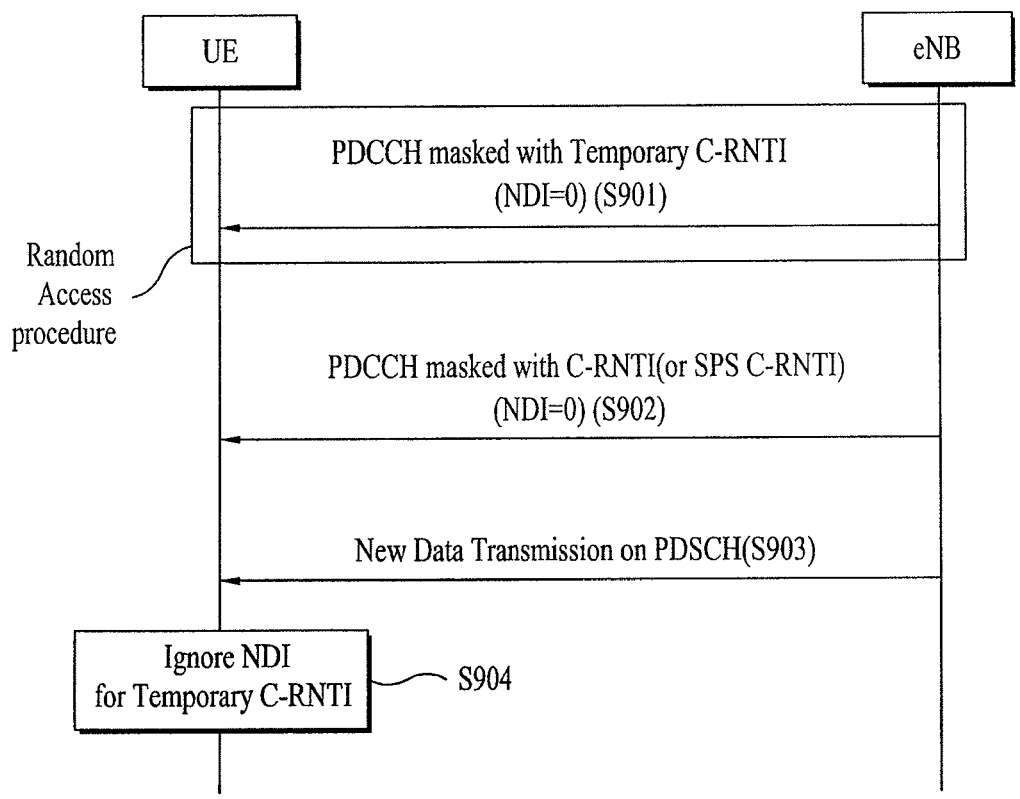
FIG. 9 is a diagram illustrating a method of receiving a downlink signal from a user equipment using a HARQ scheme in accordance with another embodiment of the present invention.

FIG. 9 is a diagram illustrating a method of receiving a downlink signal from a user equipment using a HARQ scheme in accordance with another embodiment of the present invention.

The basic principle of the method illustrated in FIG. 9 is the identical with that of uplink signal transmission illustrated in FIG. 4. Namely, as described above, the user equipment can receive DL assignment including the NDI field to receive the second message or the fourth message during the random access procedure (S901). In this case, DL assignment can be received through the PDCCH masked with the temporary cell identifier.

Even after the random access procedure ends, in order that the user equipment receives downlink data, the base station notifies the user equipment through what radio resource the user equipment should receive the PDSCH, through DL assignment information, and the user equipment receives DL assignment information (S902). This DL assignment information is received through the PDCCH masked with a cell identifier. The user equipment can receive downlink data from the base station in accordance with the DL assignment information (S903). In this case, the PDSCH corresponding to the PDCCH received in accordance with step S902 may be received before or after step S904 where it is determined whether the NDI value of the user equipment has been toggled.

Meanwhile, the user equipment can identify whether the received downlink data is newly transmitted data or retransmitted data of previous data, through the NDI field of the received DL assignment. Namely, if the NDI field value received through DL assignment is different from that previously stored to correspond to the corresponding HARQ process, the user equipment regards the received data as new data. If the received NDI field value is the same as the NDI value previously stored to correspond to the corresponding HARQ process, the user equipment tries decoding by combining the received data with the data stored in the soft buffer of the corresponding HARQ process. As described above, this embodiment suggests that the user equipment ignores the NDI received during the random access procedure, i.e., the NDI received using the temporary cell identifier when determining whether the NDI value received through DL assignment has been toggled. In the example of FIG. 9, since the NDI field value received in step S902 is 0 and the NDI received in step S901 is not considered, the user equipment regards the NDI field value received in step S901 as the initially received NDI and decodes the data received in step S903 as new data.

If the NDI received in step S901 is ignored and the NDI value received in step S903 is the same as the NDI value set for the corresponding HARQ process, the user equipment can perform decoding by combining the data received in step S903 with the previously received data.

According to this embodiment, whether the NDI value has been toggled is determined regardless of status and time as far as the NDI received using the temporary cell identifier is ignored. Also, if a plurality of NDIs are received using the temporary cell identifier, this embodiment suggests that all NDIs received using the temporary cell identifier are ignored.

Meanwhile, in the aforementioned embodiments of the present invention, how to solve the aforementioned problem where the user equipment determines, in error, whether the data transmitted from or received in the user equipment is retransmitted data, due to the NDI received during the random access procedure, will be described in detail.

Figure 10:
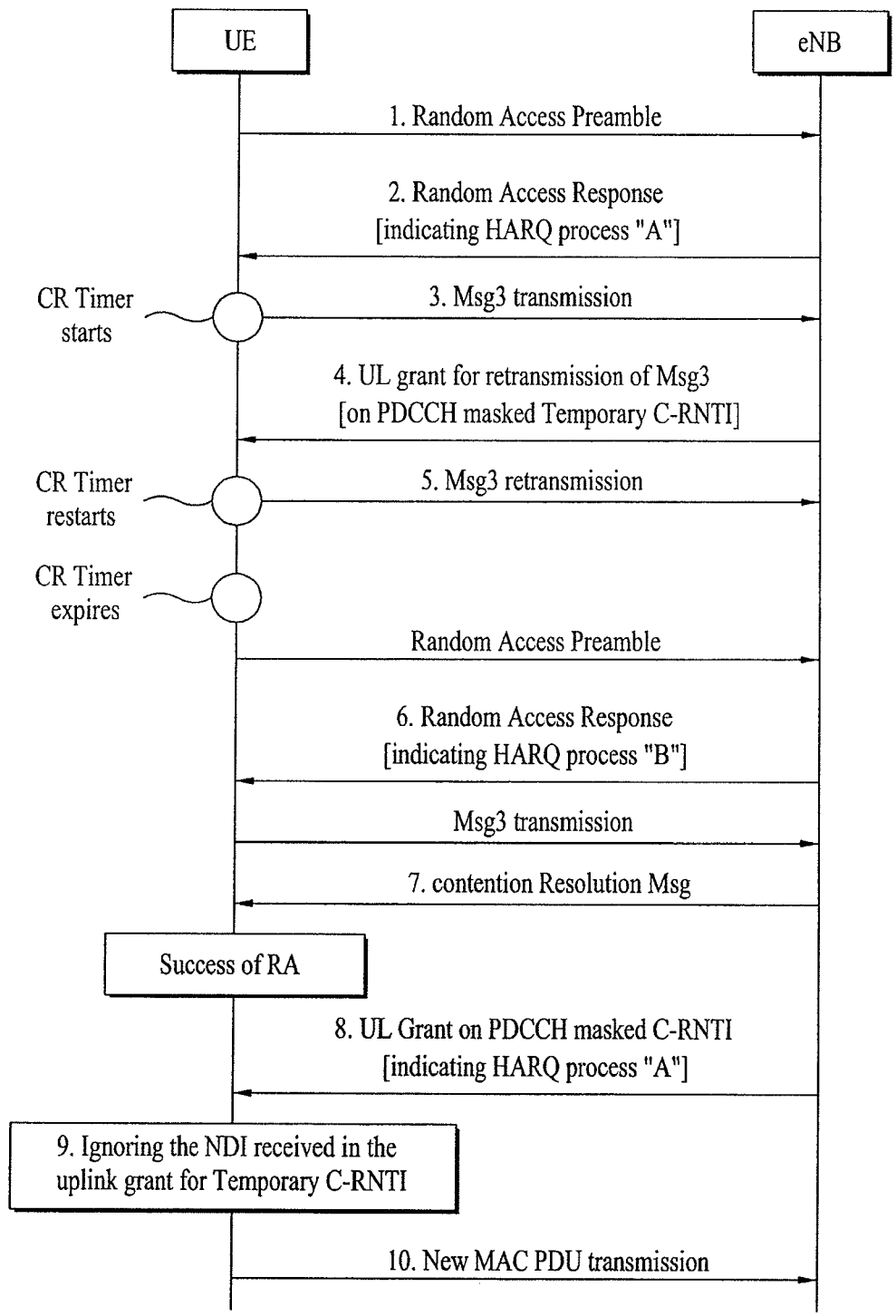
FIG. 10 is a diagram illustrating a method of transmitting an uplink signal from a user equipment in accordance with one embodiment of the present invention.

FIG. 10 is a diagram illustrating a method of transmitting an uplink signal from a user equipment in accordance with one embodiment of the present invention.

The user equipment can transmit a specific random access preamble to the base station during the random access procedure (step 1). The base station receives the random access preamble and transmits a response to the random access preamble to the user equipment (step 2). The response to the random access preamble can include UL grant to allow the user equipment to transmit the third message, and in this embodiment, it is assumed that the UL grant indicates HARQ process "A." Also, the response to the random access preamble includes a temporary cell identifier to be temporarily used by the user equipment.

The user equipment can transmit the third message to the base station using the HARQ process "A" in accordance with the received UL grant (step 3). In this way, if the third message is transmitted from the user equipment, the contention resolution timer (CR timer) starts. In specific case, the base station receives the third message but fails to decode the third message, whereby the base station can request the user equipment to retransmit the third message.

When requesting the user equipment to retransmit the third message, the base station can transmit UL grant for retransmission of the third message to the user equipment through the PDCCH masked with the temporary cell identifier of the user equipment, thereby requesting a radio resource or transport format used for transmission of the third message (step 4). Also, the NDI value can be included in the UL grant for retransmission of the third message. In this embodiment, it is assumed that the NDI value in step 4 is set to 0.

The user equipment can retransmit the third message to the base station using the received UL grant for retransmission of the third message (step 5).

If the started or restarted CR timer ends during transmission or retransmission of the third message, the user equipment determines that the random access procedure has been failed, transmits the random access preamble to the base station again, and receives the response to the random access preamble from the base station (step 6).

The UL grant for transmission of the third message is included in the random access response received in step 6. It is assumed that the UL grant indicates HARQ process "B." Also, the response to the random access preamble includes a temporary cell identifier to be temporarily used by the user equipment.

The user equipment transmits the third message to the base station using the UL grant, and the base station receives the third message, successfully performs decoding, and transmits the contention resolution message to the user equipment. Then, the user equipment which has received the contention resolution message determines that the random access procedure has been successfully completed (step 7).

After the aforementioned random access procedure is completed, the base station can transmit UL grant to the user equipment through the PDCCH masked with user equipment identifier (for example, C-RNTI or SPS C-RNTI), thereby scheduling transmission of specific data (step 8). In this embodiment, it is assumed that the UL grant transmitted in step 8 is HARQ process "A." It is also assumed that the NDI value for indicating new data transmission is set to "0" as the base station cannot identify information of the HARQ process "A" not used for ending the random access procedure but used during the random access procedure.

The user equipment receives UL grant where the NDI value corresponding to the HARQ process "A" is set to "0" during the first random access procedure and the NDI value is again set to "0" to correspond to the HARQ process "A" after the second random access procedure. In this embodiment, if the NDI received using the temporary cell identifier is not ignored when it is determined whether the NDI value has been toggled, since it is regarded that the user equipment receives UL grant where the NDI value has been toggled, the user equipment determines the UL grant as that for retransmission. Accordingly, the user equipment cannot transmit new MAC PDU in accordance with the UL grant received in step 8.

However, if the user equipment receives UL grant in step 8 in accordance with this embodiment, the user equipment ignores the NDI value for UL grant through the PDCCH masked with a temporary cell identifier. As a result, the user equipment determines the UL grant received in step 8 as UL grant for new transmission not retransmission. Then, the user equipment transmits new MAC PDU to the base station using the UL grant received in step 8 (step 9).

Figure 11:
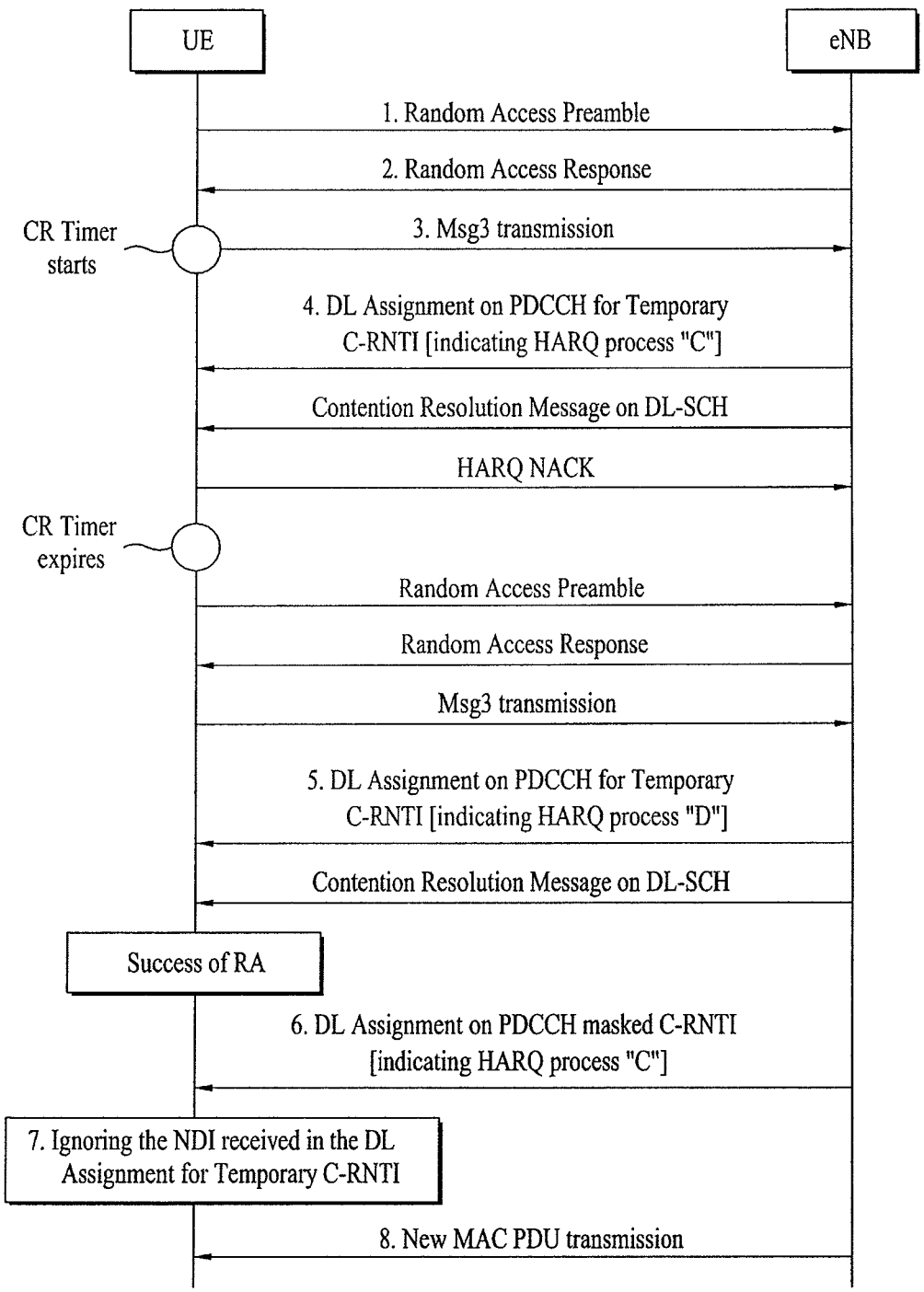
FIG. 11 is a diagram illustrating a method of receiving a downlink signal from a user equipment in accordance with one embodiment of the present invention.

FIG. 11 is a diagram illustrating a method of receiving a downlink signal from a user equipment in accordance with one embodiment of the present invention.

The user equipment transmits a random access preamble to the base station during the random access procedure (step 1), and receives a response to the random access preamble (step 2).

The user equipment transmits the third message to the base station in accordance with the UL grant received in the response to the random access preamble, and assumes that the CR timer starts (step 3).

The user equipment can receive DL assignment of the PDDCH masked with a temporary cell identifier of the user equipment from the base station (step 4). In this embodiment, it is assumed that the DL assignment indicates HARQ process "C." It is also assumed that the NDI value of the DL assignment is set to "0." Moreover, it is assumed that the user equipment receives the contention resolution message through the DL assignment but fails to decode the contention resolution message, and determines that the random access procedure is failed as the CR timer ends. As a result, it is assumed that the user equipment tries the second random access procedure.

After transmitting the third message during the second random access procedure, the user equipment receives DL assignment of the PDCCH masked with a temporary cell identifier of the user equipment from the base station, and receives the contention resolution message which includes user equipment identifier (step 5). In this embodiment, it is assumed that the DL assignment indicates HARQ process "D." In this case, the user equipment determines that the random access procedure has been successfully completed.

The user equipment can receive DL assignment of the PDCCH masked with C-RNTI of the user equipment from the base station after the random access procedure is performed (step 6). In this embodiment, it is assumed that the DL assignment indicates HARQ process "C," and the NDI value of the DL assignment is set to "0."

Since the data failed in decoding during the fourth message reception of the first random access procedure remain in the soft buffer corresponding to the HARQ process "C," if DL assignment of the PDCCH masked with the C RNTI of the user equipment indicates HARQ process "C" after the random access procedure and the NDI value is set to "0" which is not toggled, and if the NDI value received using the temporary C-RNTI is not ignored in the same manner as this embodiment, the user equipment tries combination of the data stored in the soft buffer of the HARQ process "C" with newly received data. However, the user equipment according to this embodiment receives DL assignment after the random access procedure, and ignores the NDI indicated by assignment of the PDDCH masked with a temporary C-RNTI during the random access procedure when determining whether the NDI value of the DL assignment has been toggled (step 7). As a result, the user equipment determines the assignment of the PDCCH masked with the C-RNTI as DL assignment for new transmission not retransmission, does not combine the data received in step 8 with the data stored in the HARQ soft buffer, deletes previous data, stores the data newly received in step 8 in the soft buffer, and tries decoding.

Hereinafter, a configuration of the user equipment for uplink signal transmission and downlink signal reception will be described.

Figure 12:
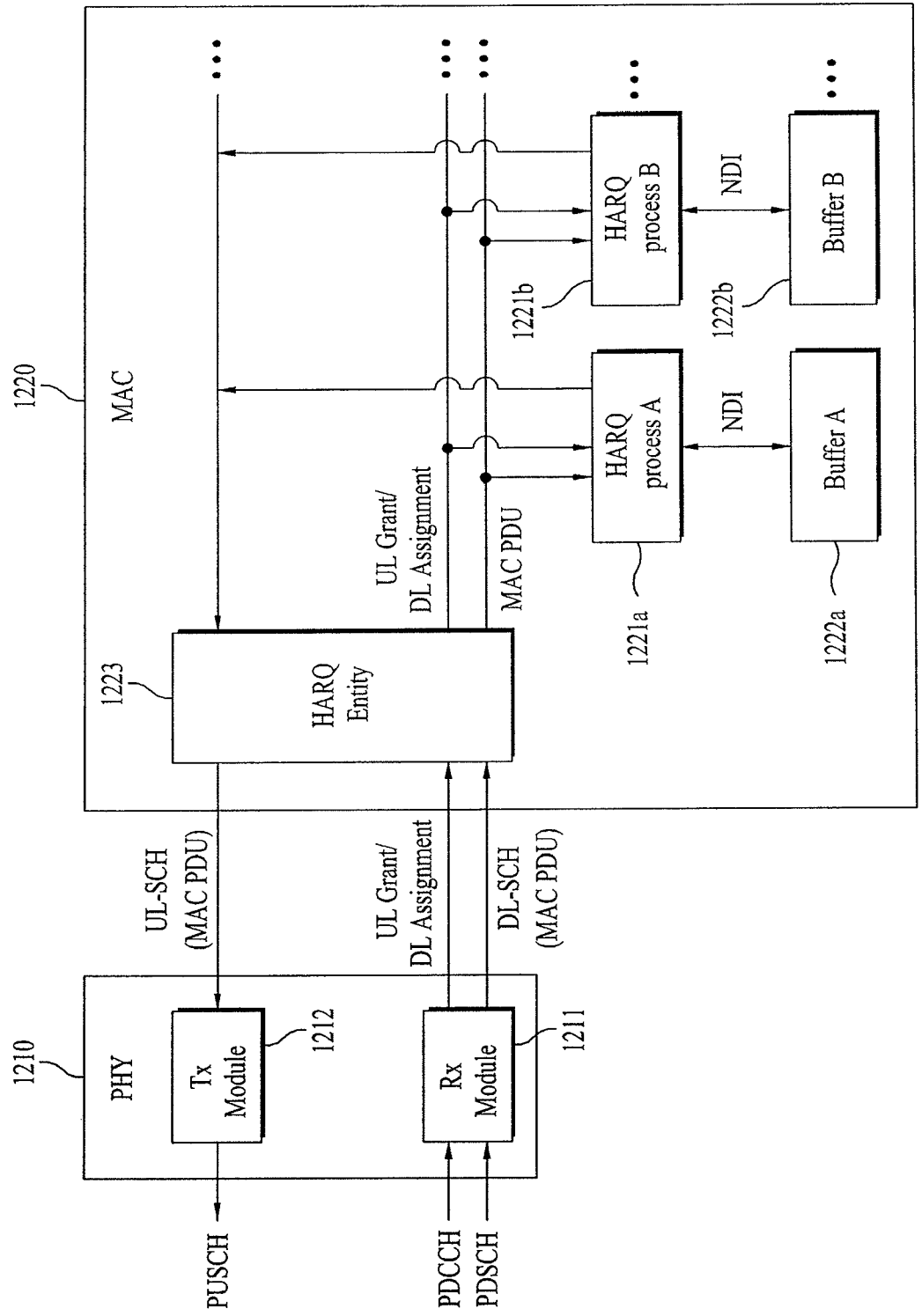
FIG. 12 is a diagram illustrating a configuration of a user equipment in accordance with one embodiment of the present invention.

FIG. 12 is a diagram illustrating a configuration of a user equipment in accordance with one embodiment of the present invention.

The user equipment according to one embodiment of the present invention includes a physical layer module 1210 for transmitting an uplink signal and receiving a downlink signal, and a MAC layer module 1220 for performing signal mapping between an upper layer module and the physical layer module 1210. In more detail, the physical layer module includes a receiving module 1211 for receiving a PDCCH including an NDI toggled when the base station indicates new transmission and receiving a PDSCH corresponding to the PDCCH, and a transmitting module 1212 performing PUSCH transmission corresponding UL grant received through the PDCCH. Also, the MAC layer module includes a plurality of HARQ process modules 1221 and a plurality of buffers 1222 respectively corresponding to the plurality of HARQ process modules. It is assumed that the plurality of buffers 1222 include HARQ buffers for storing HARQ control information associated with the corresponding HARQ process 1221. It is also assumed that the plurality of buffers 1222 include a soft buffer for temporarily storing data processed by the other corresponding HARQ process 1221.

The MAC layer module 1220 further includes a single HARQ entity 1223 controlling MAC layer HARQ operation of the user equipment. The HARQ entity 1223 serves to control corresponding data transmission or reception to be performed through a specific one of the HARQ processes 1221 considering a receiving time of the downlink signal received by the receiving module 1221 of the physical layer module 1210.

Meanwhile, the user equipment according to this embodiment determines whether to perform retransmission depending on whether the NDI value has been toggled, by comparing the NDI value previously stored in a specific buffer corresponding to a specific process with the NDI value received to correspond to the specific HARQ process. In this case, it is configured that the NDI received using a temporary cell identifier stored in the specific buffer is ignored when it is determined whether the NDI value has been toggled. Preferably, this configuration is configured in the module performing a function of determining whether the NDI value has been toggled. The HARQ entity 1223 may determine whether the NDI value has been toggled, or each HARQ process 1221 may determine whether the NDI value has been toggled.

Through the aforementioned configuration, the problem where the user equipment determines retransmission in error after the random access procedure due to the NDI value received during the random access procedure as described with reference to FIG. 10 and FIG. 11 can be solved.

The aforementioned signal transmission and reception and the configuration of the user equipment for the same according to the present invention have been described based on the 3GPP LTE system. However, the signal transmission and reception and the configuration of the user equipment for the same may be applied to various mobile communication systems similar to the 3GPP LTE system.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. An apparatus configured to perform wireless communications, the apparatus comprising:
   a transmission module;
   at least one processor; and
   at least one computer memory operably connectable to the at least one processor and storing instructions that, when executed by the at least one processor, perform operations comprising:
   determining whether a physical downlink control channel (PDCCH) carrying an uplink grant is not addressed to a temporary cell identifier;
   based on a determination that the PDCCH is not addressed to the temporary cell identifier, determining whether a new data indicator (NDI) included in the uplink grant has been toggled; and
   controlling the transmission module for transmitting a new data to a network, based on a determination that the NDI has been toggled.

2. The apparatus of claim 1, wherein the operations further comprise:
   performing a retransmission, based on a determination that the NDI has not been toggled.

3. The apparatus of claim 1, wherein the operations further comprise:
   controlling the transmission module for receiving the PDCCH from the network.

4. An apparatus configured to perform wireless communications, the apparatus comprising:
   a reception module;
   at least one processor; and
   at least one computer memory operably connectable to the at least one processor and storing instructions that, when executed by the at least one processor, perform operations comprising:
   controlling the reception module for receiving a physical downlink control channel (PDCCH) carrying a downlink assignment from a network and for receiving a downlink data based on the downlink assignment from the network;
   determining whether the PDCCH is not addressed to a temporary cell identifier;
   based on a determination that the PDCCH is not addressed to the temporary cell identifier, determining whether a new data indicator (NDI) included in the downlink assignment has been toggled; and
   processing the received downlink data based on whether the NDI has been determined to be toggled.

5. The apparatus of claim 4, wherein the operations further comprise:
   based on the NDI having been determined to be toggled, processing the downlink data as a new transmission.

6. The apparatus of claim 4, wherein the operations further comprise:
   based on the NDI having been determined not to be toggled, processing the downlink data as a retransmission.

7. A method performed by an apparatus configured for wireless communications, the method comprising:
   determining whether a physical downlink control channel (PDCCH) carrying an uplink grant is not addressed to a temporary cell identifier;
   based on a determination that the PDCCH is not addressed to the temporary cell identifier, determining whether a new data indicator (NDI) included in the uplink grant has been toggled; and
   transmitting a new data to a network, based on a determination that the NDI has been toggled.

8. The method of claim 7, further comprising:
   performing a retransmission, based on a determination that the NDI has not been toggled.

9. The method of claim 7, further comprising:
receiving the PDCCH from the network.

* * * * *